(12) United States Patent
Moore et al.

(10) Patent No.: US 11,410,673 B2
(45) Date of Patent: Aug. 9, 2022

(54) AUDIO PROCESSING FOR VEHICLE SENSORY SYSTEMS

(71) Applicant: SOLTARE INC., Edmonton (CA)

(72) Inventors: Brian Moore, Edmonton (CA); Viet Hoang, Edmonton (CA); Ken Brizel, Edmonton (CA); Siamak Akhlaghi Esfahany, Edmonton (CA); Warren Sheydwasser, Edmonton (CA); Ajay Sandhu, Edmonton (CA)

(*) Notice: Subject to any disclaimer, the term of this patent is extended or adjusted under 35 U.S.C. 154(b) by 0 days.

(21) Appl. No.: 15/970,494

(22) Filed: May 3, 2018

(65) Prior Publication Data

US 2018/0350391 A1 Dec. 6, 2018

Related U.S. Application Data

(60) Provisional application No. 62/532,532, filed on Jul. 14, 2017, provisional application No. 62/500,987, filed on May 3, 2017.

(51) Int. Cl.
*G10L 25/51* (2013.01)
*G05D 1/02* (2020.01)
(Continued)

(52) U.S. Cl.
CPC ............ *G10L 25/51* (2013.01); *B60Q 1/0023* (2013.01); *B60Q 9/00* (2013.01); *B60R 1/12* (2013.01); *G05D 1/0255* (2013.01); *G10K 11/16* (2013.01); *H04L 12/2836* (2013.01); *H04R 1/406* (2013.01); *B60R 16/0238* (2013.01); *B60R 2001/1223* (2013.01); *B60W 2050/143* (2013.01); *G05D 2201/0213* (2013.01); *G10K 11/162* (2013.01); *G10K 11/172* (2013.01); *H04L 2012/40215* (2013.01);
(Continued)

(58) Field of Classification Search
CPC ................ H04R 2499/13; H04R 29/00; G10L 2021/02166
USPC .............................. 381/56, 86, 346, 353, 354
See application file for complete search history.

(56) References Cited

U.S. PATENT DOCUMENTS 1,105,607 A 8/1914 Benjamin
3,997,868 A 12/1976 Ribnick et al.
(Continued)

FOREIGN PATENT DOCUMENTS

CA 2996927 3/2018
CA 2996927 9/2018
(Continued)

OTHER PUBLICATIONS

Walt Kester: MT-022 Tutorial ADC Architectures III: Sigma-Delta ADC Basics11, Oct. 30, 2008 (Oct. 30, 2008), XP055256686, Retrieved from the Internet: URL:http://www.analog.com/media/en/training-seminars/tutorials/MT-022.pdf.

*Primary Examiner* — Alexander Krzystan
(74) *Attorney, Agent, or Firm* — Bennett Jones LLP

(57) ABSTRACT

Audio-derived information is provided to a vehicle control system of a vehicle by attaching a microphone externally to a vehicle to generate an analog signal in response to sound waves external to the vehicle. An enclosure containing sound-attenuating material mechanically filters low frequency sounds from reaching the microphone transducer. An analog-to-digital converter converts the analog signal to a digital signal. A vehicle data bus transfers the digital signal to the vehicle control system.

23 Claims, 6 Drawing Sheets

(51) Int. Cl.

| | | |
|---|---|---|
| *B60Q 1/00* | (2006.01) | |
| *B60R 1/12* | (2006.01) | |
| *B60Q 9/00* | (2006.01) | |
| *H04R 1/40* | (2006.01) | |
| *G10K 11/16* | (2006.01) | |
| *H04L 12/28* | (2006.01) | |
| *H04R 3/00* | (2006.01) | |
| *B60R 16/023* | (2006.01) | |
| *G10K 11/162* | (2006.01) | |
| *H04R 1/26* | (2006.01) | |
| *G10K 11/172* | (2006.01) | |
| *H04R 1/08* | (2006.01) | |
| *H04L 12/40* | (2006.01) | |
| *B60W 50/14* | (2020.01) | |

(52) U.S. Cl.
CPC ........... *H04L 2012/40234* (2013.01); *H04L 2012/40273* (2013.01); *H04R 1/086* (2013.01); *H04R 1/265* (2013.01); *H04R 3/005* (2013.01); *H04R 2499/13* (2013.01)

(56) References Cited

U.S. PATENT DOCUMENTS

| | | |
|---|---|---|
| 5,287,411 A | 2/1994 | Hill et al. |
| 5,352,938 A | 10/1994 | Wise et al. |
| 6,091,830 A | 7/2000 | Toki |
| 6,349,246 B1 | 2/2002 | Smith et al. |
| 6,362,749 B1 | 3/2002 | Brill |
| 6,452,506 B2 | 9/2002 | Wilhelm |
| 6,570,992 B1* | 5/2003 | Folan ............... H04M 1/03 379/433.03 |
| 6,614,911 B1* | 9/2003 | Watson ............. H04B 1/3805 381/357 |
| 6,958,707 B1 | 10/2005 | Siegel |
| 7,120,261 B1* | 10/2006 | Turnbull ........... B60R 11/0247 381/86 |
| 7,612,485 B2 | 11/2009 | Sugiura et al. |
| 7,675,431 B1 | 3/2010 | Caouette, Sr. |
| 7,791,499 B2 | 9/2010 | Mohan et al. |
| 8,319,620 B2 | 11/2012 | Usher et al. |
| 8,976,040 B2 | 3/2015 | Avalani |
| 9,224,294 B1 | 12/2015 | St. John |
| 9,275,136 B1 | 3/2016 | Sharifi et al. |
| 9,397,630 B2 | 7/2016 | Wang et al. |
| 10,072,967 B2 | 9/2018 | Mirov et al. |
| 10,236,018 B2 | 3/2019 | Moore et al. |
| 10,639,804 B2 | 5/2020 | Boria et al. |
| 10,916,260 B2 | 2/2021 | Moore et al. |
| 2002/0110250 A1 | 8/2002 | Schwald |
| 2002/0110256 A1* | 8/2002 | Watson ................ B60R 1/12 381/389 |
| 2004/0258252 A1* | 12/2004 | Inoue ................. G10K 11/178 381/71.4 |
| 2006/0181457 A1 | 8/2006 | Bartz |
| 2007/0008175 A1 | 1/2007 | Johnson et al. |
| 2007/0146127 A1 | 6/2007 | Stilp et al. |
| 2007/0216539 A1 | 9/2007 | D'Antoni et al. |
| 2009/0052687 A1 | 2/2009 | Schwartz |
| 2009/0097674 A1* | 4/2009 | Watson ................ B60R 1/12 381/86 |
| 2009/0125311 A1* | 5/2009 | Haulick ............ B60R 16/0373 704/275 |
| 2009/0179774 A1 | 7/2009 | Mohan et al. |
| 2009/0322559 A1 | 12/2009 | Yen et al. |
| 2010/0316255 A1 | 12/2010 | Mathony et al. |
| 2011/0199230 A1 | 8/2011 | Stahlin et al. |
| 2011/0296794 A1* | 12/2011 | Thomas ................ B32B 7/14 52/784.11 |
| 2013/0010980 A1* | 1/2013 | Yoshioka ............. G01S 3/802 381/92 |
| 2014/0301571 A1 | 10/2014 | Melanson et al. |
| 2014/0350927 A1 | 11/2014 | Yamabe et al. |
| 2015/0063575 A1 | 3/2015 | Tan |
| 2015/0382102 A1* | 12/2015 | Akino ............... H04R 1/2876 381/346 |
| 2016/0012813 A1* | 1/2016 | Every ................. G10L 25/78 381/66 |
| 2016/0094911 A1* | 3/2016 | Kropf ................. H04R 1/44 381/334 |
| 2016/0364963 A1* | 12/2016 | Matsuoka ........... G10L 25/51 |
| 2018/0211528 A1* | 7/2018 | Seifert .............. G06K 9/00805 |
| 2018/0242065 A1* | 8/2018 | Doi .................... H04R 1/04 |
| 2018/0261237 A1 | 9/2018 | Moore et al. |
| 2018/0332389 A1* | 11/2018 | Ekkizogloy ......... H04R 1/406 |
| 2019/0114489 A1* | 4/2019 | Jackson ............. G06K 9/6289 |
| 2019/0172478 A1 | 6/2019 | Moore et al. |

FOREIGN PATENT DOCUMENTS

| | | |
|---|---|---|
| CA | 3053668 | 9/2018 |
| CA | 3003840 | 11/2018 |
| DE | 19749372 | 5/1999 |
| EP | 0788238 | 8/1997 |
| JP | H08156711 | 6/1996 |
| JP | H10156711 | 6/1996 |
| JP | 2013239938 | 11/2013 |
| WO | 9931637 | 6/1999 |
| WO | 2003091066 A2 | 11/2003 |
| WO | 2012097150 | 7/2012 |
| WO | 2016149828 | 9/2016 |
| WO | 2018141058 | 8/2018 |
| WO | 2018157251 | 9/2018 |
| WO | 2018201252 | 11/2018 |

\* cited by examiner

AUDIO PROCESSING FOR VEHICLE SENSORY SYSTEMS

FIELD OF THE INVENTION

The present invention relates to systems and methods for processing audio signals with a vehicle sensory system.

BACKGROUND OF THE INVENTION

Driver assistance systems and sensing systems for semi- or fully-autonomous vehicles may use a variety of sensor types to effectively allow a vehicle to sense its surroundings. However, each sensor type is associated with drawbacks. Optical systems using cameras that capture images, or optical sensors to capture reflected light (lidar), are limited by "line-of-sight", are relatively expensive, and require powerful processors to deal with large amounts of data. Radar systems that detect reflected radio waves are less data-intensive, but provide far less information. Systems that detect reflected ultrasound waves are useful only in short ranges, and are limited to applications such as parking-assist sensors.

To the knowledge of the inventors, there are no driver assistance systems or autonomous vehicle systems that use microphones or other audio sensors to provide additional data representative of the vehicle surroundings. In order to do so, one challenge to be overcome is integrating the audio sensors with the driver assistance system or autonomous vehicle system. Another challenge is presented by noise created by wind or air-buffeting, which may make it difficult or impossible to detect a target sound of interest. Although, noise can be electronically filtered from a sound sample, this increases computational time and costs to an extent which may not be practical for near real-time sound detection as required in vehicular applications.

SUMMARY OF THE INVENTION

In one aspect, the present invention comprises a system for providing audio-derived information to a vehicle operator, the system comprising:
  (a) at least one microphone mounted in or to the vehicle for generating an analog signal in response to sound waves external to the vehicle; and
  (b) an analysis module associated with the at least one microphone for converting the analog signal to a digital signal, wherein the analysis module is configured to communicate the digital signal to a vehicle data bus for communicating or transferring the digital signal to the vehicle operator or vehicle control system.

In one embodiment, the vehicle operator is a human driver and the digital signal results in a notification to the driver. In another embodiment, the vehicle operator is a vehicle control system, such as in an autonomous or semi-autonomous vehicle, and the digital signal results in an electronic notification to the vehicle control system.

In another aspect, the invention may comprise a method for providing audio-derived information to a vehicle operator, the method comprising the steps of:
  (a) providing at least one externally facing microphone with the vehicle for generating an analog signal in response to sound waves external to the vehicle;
  (b) converting the analog signal to a digital signal and communicating the digital signal to a vehicle data bus to transfer the digital signal to the vehicle operator.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

Definitions

Figure 1:
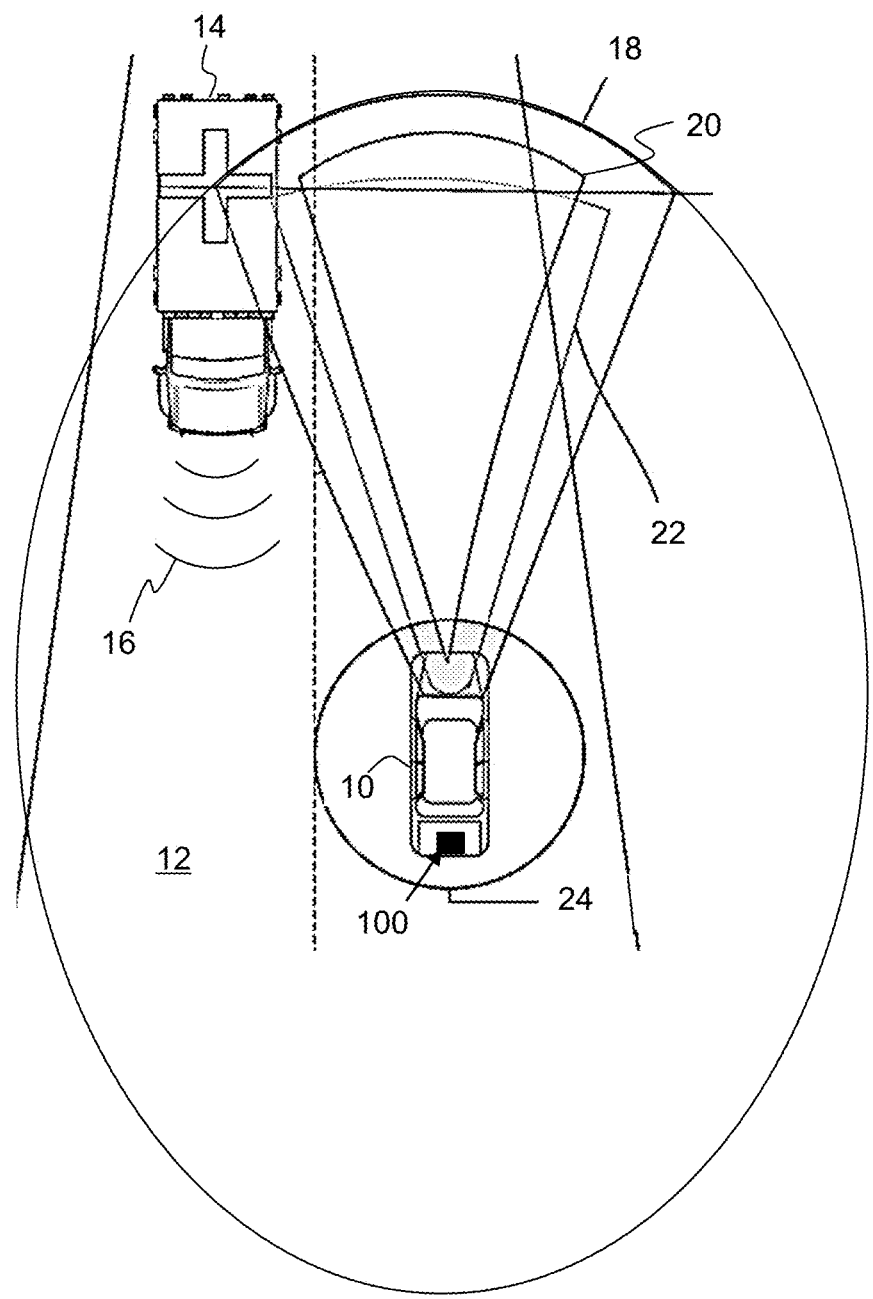
FIG. 1 shows a vehicle equipped with an embodiment of a system of the present invention, and an emergency vehicle emitting a siren sound, while travelling on a roadway.

Any term or expression not expressly defined herein shall have its commonly accepted definition understood by a person skilled in the art. As used herein, the following terms have the following meanings.

"Audio sensor" refers to a device that detects and converts a sound wave into an electrical signal. In an embodiment, an audio sensor may be a microphone comprising a transducer.

"Computer processor" refers to an electronic device that is capable of processing an input electronic signal to produce an output electronic signal. In embodiments, a computer processor may include one or more devices commonly referred to as a programmable logic controller, a printed circuit board, an integrated circuit, a microcontroller, a processor or the like. A "computing device" comprises at least one computer processor, and may also include computer-readable memory which may include instructions which are executable by the processor.

"Non-transitory computer-readable memory" refers to a tangible medium capable of storing data and/or instructions in a format readable by a computer processor. In embodiments, a non-transitory computer-readable memory may include magnetic media, optical media, or solid-state media.

"Target sound" refers to a specific sound of interest to be detected. A target sound may be within the human audible spectrum, or outside of the human audible spectrum (e.g., ultrasonic sounds in excess of 20 kHz). As non-limiting examples, in the context of a moving vehicle, a target sound may be the sound produced by an emergency vehicle siren, a horn of another vehicle, a crosswalk assistance sound for visually impaired pedestrians, skidding tires indicating a vehicle losing control, a vehicle colliding with another vehicle or an object, animal noises, or human voices.

"Vehicle" refers to a machine used to transport people and/or goods. As a non-limiting example, a vehicle may be any self-powered, wheeled vehicle including an automobile, motorcycle, truck, or bus. A vehicle may be non-autonomous, semi-autonomous, or fully autonomous.

"Vehicle control system" refers to a system that controls, directly or indirectly, any aspect of a vehicle's dynamics, or that provides information relevant to controlling any aspect of a vehicle's dynamics. A vehicle control system is distinguished from a vehicle entertainment system that is used solely to entertain a vehicle's driver or occupants. For example, a GNSS or GPS navigation system may be considered part of a vehicle control system, as it provides useful information to a driver regarding a vehicle's position and direction of travel, even though the satellite navigation system may be integrated into what is conventionally referred to as an "infotainment" system. A vehicle control system may or may not have a human interface.

In general terms, the invention may comprise a vehicular auditory sensing system to provide an input to a vehicle operator or a vehicle control system, comprising at least one microphone coupled to an analysis module configured to convert an analog signal produced by the microphone to a digital signal and to communicate the digital signal to a vehicle data bus for communicating the digital signal to the vehicle operator or vehicle control system.

The information contained in the digital signal and derived from the audio sensors of the present invention may be processed and used to provide notification to the driver, a vehicle control system, or a remote entity, and/or processed and used to adjust visual or audio conditions inside the vehicle, and/or used to control the vehicle dynamics without human input or to override human input.

System.

FIG. 1 shows a vehicle (10) on a roadway (12) with an approaching emergency vehicle (14) emitting a siren sound as depicted by sound waves (16). The vehicle (10) is equipped with an embodiment of the system (100) of the present invention for detecting the siren sound as a target sound, having a detection range denoted by the zone (18). In this example, the vehicle (10) is also equipped with an optical sensing system, a radar sensing system, and an ultrasound sensing system having detection ranges denoted by zones (20), (22), and (24), respectively. The system (100) may be installed in the vehicle (10) during original manufacturing or as an aftermarket system to interface with existing vehicle data buses and vehicle control systems.

Figure 2:
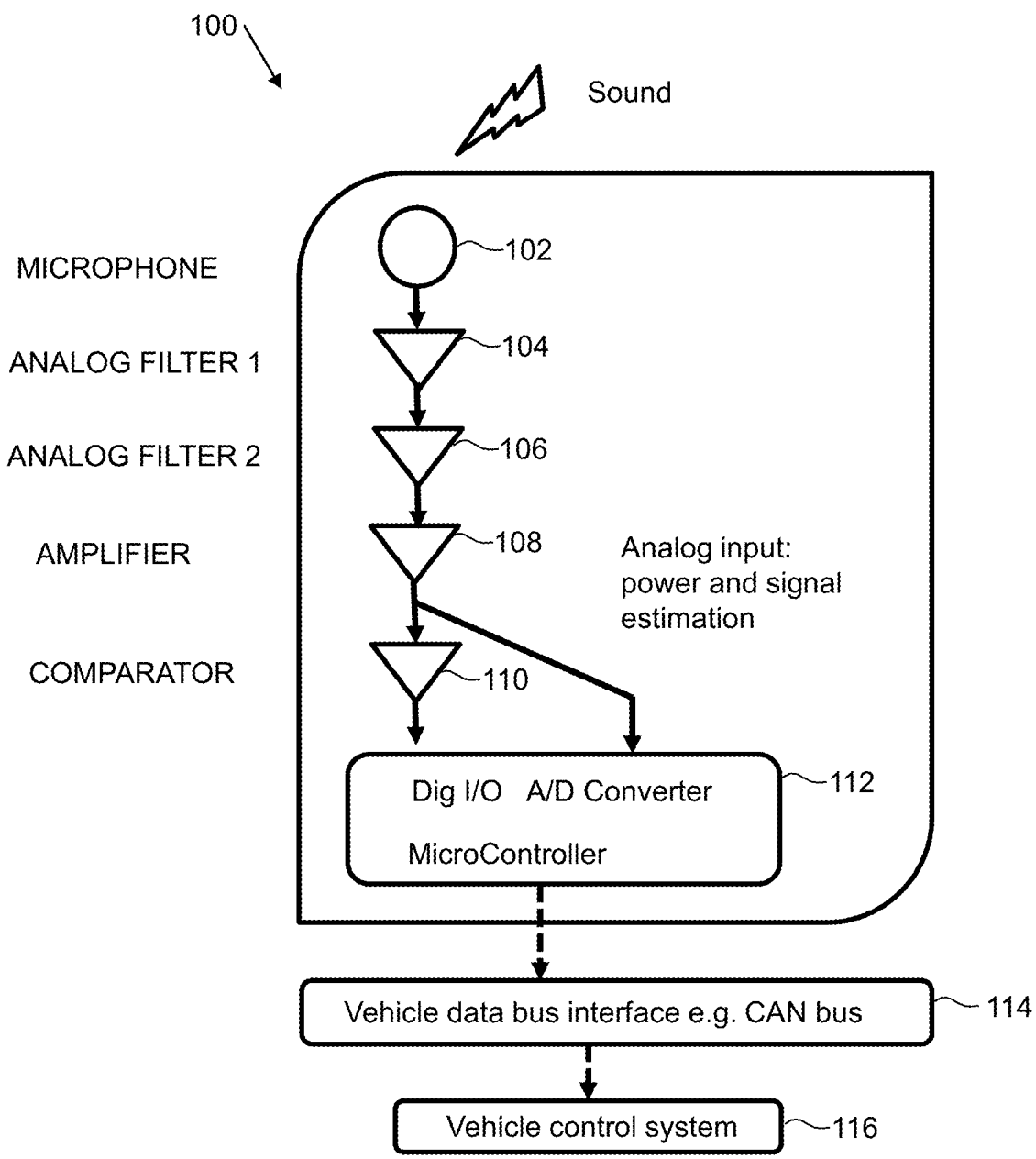
FIG. 2 shows a schematic depiction of a first embodiment of a system of the present invention comprising a single microphone with processing elements and an associated analysis module operatively connected to a vehicle control system via a data bus.
Figure 7:
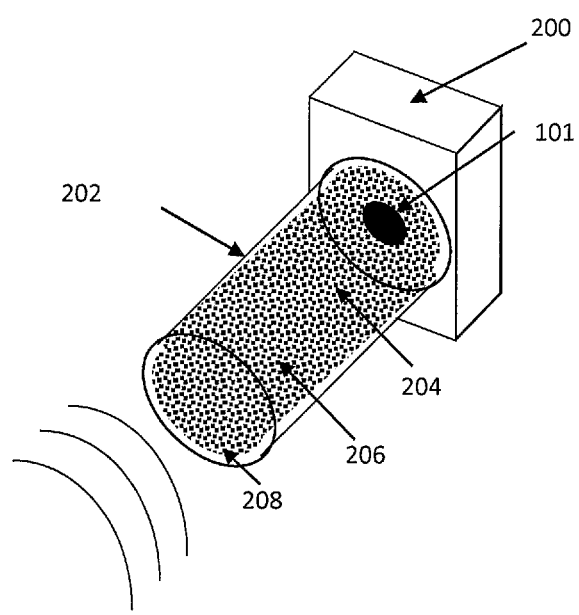
FIG. 7 shows an exploded perspective view of an embodiment of an enclosure of the present invention for an audio sensor in the form of a transducer.

FIG. 2 shows a schematic representation of one embodiment of a system (100) of the present invention for providing audio-derived information to a vehicle control system, using an external microphone (102) or other audio sensor operatively connected to an analysis module (112), which is in turn operatively connected to a vehicle data bus (114) that is connected with a vehicle control system (116). In embodiments, the system (100) may also include a sound-filtering or sound-absorbing device for the external microphone, as shown in FIG. 7. The components of the system (100) are described in greater detail below.

Audio Sensor.

The at least one microphone (102) is outward facing meaning it detects sound waves in the external environment of the vehicle (10), and converts them into an analog signal for processing by the system (100). The microphone may be physically located anywhere on or in a vehicle, provided it is directly exposed externally, or is provided a channel by which external sounds can reach the microphone.

Figure 3:
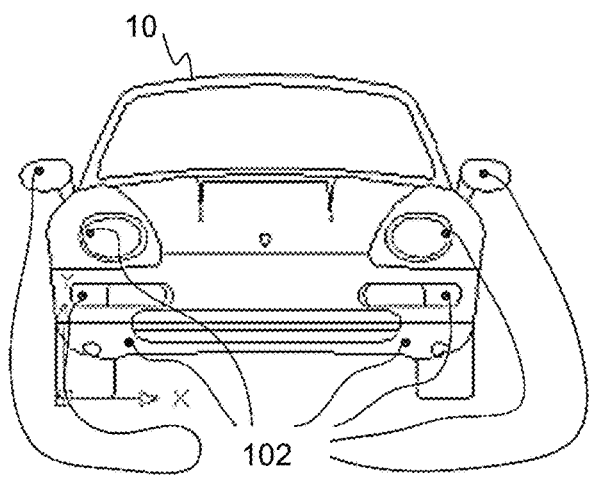
FIG. 3 shows a front view of a vehicle incorporating a plurality of microphones, in accordance with an embodiment of the system of the present invention.
Figure 4:
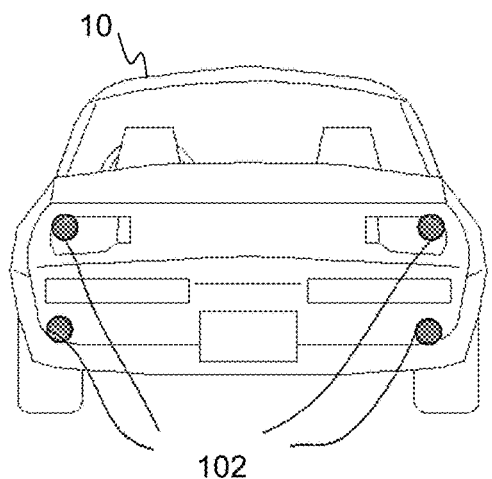
FIG. 4 shows a rear view of a vehicle incorporating a plurality of microphones, in accordance with an embodiment of the system of the present invention.
Figure 5:
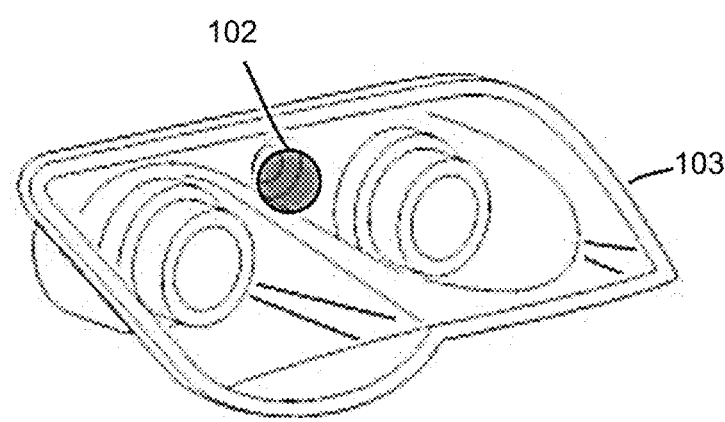
FIG. 5 shows a vehicle headlight assembly incorporating a microphone, in accordance with an embodiment of the system of the present invention.
Figure 6:
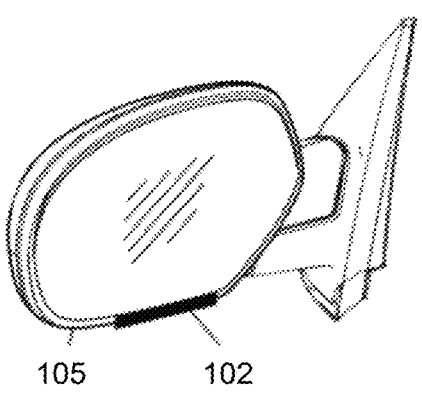
FIG. 6 shows a vehicle side mirror assembly incorporating a microphone, in accordance with an embodiment of the system of the present invention.

In embodiments, the microphone (102) may be incorporated into the vehicle (10) in a variety of ways and locations. Preferably, there are four or more microphones (102), which provides 360° of coverage around the vehicle. For example, as shown in FIGS. 3 and 4, microphones (102) may be conveniently integrated with light assemblies around the periphery of the vehicle (10), such as a headlight, fog light or driving light, taillight, side marker or signal light assembly, in side-mirrors, in bumpers, and/or in a lower fairing. As another example, a microphone (102) may be located in a housing that is attached to the vehicle (10), such as a separate discrete housing, a headlight housing (103) as shown in FIG. 5, or in a side-mirror housing (105) as shown in FIG. 6. The housings may include other sensing devices such as cameras, radar, lidar and ultrasonic sensors, or other devices on the exterior of the vehicle (10) such as side-mirrors, antennas, headlights, taillights, bumpers or flashing lights. While the microphones (102) may be physically integrated with other sensors in the same housing, data may be transmitted from the different microphones using the same or different vehicle data bus networks.

Enclosure for Audio Sensor.

In one embodiment of the system, a sound-filtering or sound-absorbing device may be provided to mechanically filter or absorb sound waves impinging on a microphone (102) which is externally exposed to the environment, so as to reduce the amount of noise detected by the transducer (101) of the microphone (102). The device comprises an enclosure (202) filled with a sound-attenuating material (206), which preferably is relatively effective in absorbing low frequency sounds, for example, sounds with a frequency less than about 500 Hz.

In one embodiment, as shown in FIG. 7, the device includes a rear enclosure (200) behind the transducer (101). The device also includes a front enclosure (202) in front of the transducer (101) of the microphone (102), which contains the sound-attenuating material (206) and forms an acoustic chamber (204) in front of the transducer (101). Port openings (208) in the front enclosure (202) allow soundwaves to travel into the acoustic chamber (204) and impinge on the transducer. The port openings (208) should be configured to avoid resonant frequencies caused by air movement around or into the port openings (208).

In one embodiment, as shown in FIG. 7, the front enclosure (202) is cylindrical, but may also be parabolic, conical or prismatic. Preferably, the acoustic chamber (204) formed by the front enclosure (202) has a length greater than its width, such that sound waves must travel some distance through the sound absorbing material before reaching the transducer. The enclosure (200, 202) itself is preferably an acoustical material which displays some sound absorption characteristics. Alternatively, either or both the inner and outer surfaces of the front enclosure (202) may also be coated with a suitable material having sound absorption characteristics.

Road and wind noise produced by a moving vehicle has substantial components in the range below about 500 Hz. In one embodiment, the sound-attenuating material (206) is preferably a low-density porous or fibrous material which attenuates sound waves having a frequency less than about 500 Hz. High absorption at low frequencies is achieved by inserting a low-density fibrous or porous material in the acoustic chamber (204). The low-density sound-attenuating material (206) provides a sufficiently tortuous path so that sound waves cannot directly reach the transducer (101) from any of the port openings (208).

In one embodiment, the sound-attenuating material (206) may preferably be easily shapeable, be stable through a large temperature range, and should not be toxic or a pollutant. It would be further preferable if the sound-attenuating material (206) is easily recyclable and is cost-efficient to manufacture and handle.

In one embodiment, the sound-attenuating material (206) may comprise insulation products such as mineral wool, fiberglass wool, cellulose or cotton. It is preferred that the material be waterproof, in that it does not absorb water or has a hydrophobic surface. A representative material comprises stone (basalt) wool products such as Roxul Safe 'n' Sound™ (Roxul Inc.; Milton, Ontario, Canada), which has a density of about 40 kg/m³. Table 1, below, shows the sound absorption coefficient (SAC) of 3-inch thick Roxul Safe 'n' Sound™ insulation at different frequencies when tested in accordance with the ASTM C423 standard (ASTM International; West Conshohocken, Pa., USA). In Table 1, the Noise Reduction Coefficient (NRC) is the average of the SACs at the 6 different frequencies.

TABLE 1

| 125 Hz | 250 Hz | 500 Hz | 1000 Hz | 2000 Hz | 4000 Hz | NRC |
|---|---|---|---|---|---|---|
| 0.52 | 0.96 | 1.18 | 1.07 | 1.05 | 1.05 | 1.05 |

Table 2, below, summarizes the acoustical performance characteristics and density of other materials that may also be used for the sound-attenuating material (208). The products branded Roxul™ are available from Roxul Inc., Milton, Ontario, Canada; the products branded by ATS Acoustics™ are available from ATS Acoustics, Piper City, Ill., USA; the products branded Owens Corning™ are available from Owens Corning Canada Inc., Edmonton, Alberta, Canada; the products branded Applegate™ are available from Applegate Insulation, Webberville, Mich., USA.

TABLE 2

| | SAC | | | | | |
|---|---|---|---|---|---|---|
| Product | 125 Hz | 500 Hz | 1000 Hz | 4000 Hz | NRC | Density (lb/ft³) |
| Mineral Wool | | | | | | |
| Roxul Acoustic Fire Batts ™ | 0.95 | 0.28 | 1.09 | 1.09 | 1.07 | 2.5 |
| Roxul Rockboard 60 ™ (2" thickness) | 0.95 | 0.32 | 1.06 | 1.02 | 1.04 | 6.0 |
| Roxul Rockboard 80 ™ (2" thickness) | 1.00 | 0.43 | 0.90 | 0.97 | 1.00 | 8.0 |
| Fiberglass—Multi Purpose | | | | | | |
| ATS Acoustics Rigid Fiberglass ™ (2" thickness) | 1.00 | 0.29 | 1.11 | 1.13 | 1.03 | 3.0 |
| Owens Corning 703 ™ (1" thickness) | 0.70 | 0.11 | 0.68 | 0.90 | 0.96 | 3.0 |
| Owens Corning 703 ™ (2" thickness) | 1.00 | 0.17 | 1.14 | 1.07 | 0.98 | 3.0 |
| Owens Corning 705 ™ (1" thickness) | 0.65 | 0.02 | 0.63 | 0.85 | 0.95 | 6.0 |
| Owens Corning 705 ™ (2" thickness) | 0.95 | 0.16 | 1.02 | 1.01 | 0.99 | 6.0 |
| Other material | | | | | | |
| Applegate ™ Cotton Batts | 1.05 | 0.27 | 1.17 | 1.15 | 1.06 | 2.5 |

In one embodiment, an outer protective cover (not shown) may be provided in front of a microphone enclosure or channel, to prevent water and debris from reaching the sound-attenuating material and/or the microphone. The cover must still allow sufficient sound to pass through to the microphone. In one embodiment, the cover can made from any membranous material that is waterproof or water resistant, and preferably waterproof and breathable, such as a tightly woven fabric bonded with a polytetrafluoroethylene polymer (Gore-Tex™). The membrane may also be made from other polymer or elastomer materials such as latex, tightly woven synthetic textile, or a nonwoven product such as spunbond olefin or flashspun polyethylene fiber (Tyvek™), and may be coated or uncoated.

Analysis Module.

Conventional vehicle data buses (114) are not capable of transmitting analog sound signals. Therefore, each microphone (102) of the present invention is preferably bundled with an analysis module (112) to convert an analog signal produced by the microphone (102) to a digital representation of sound and, in one embodiment, to identify the digital sample as a sound of interest. Thus, the vehicle data bus need only to communicate a signal which is a positive identification of a sound of interest, rather than any analog or digital auditory data.

Multibit digital encoding of sound can produce streams of data in the range of hundreds of kilobits per second, which can overwhelm conventional data buses in a vehicle. Therefore, each microphone is associated with an analysis module comprising a computing device (e.g., a microcontroller that provides a computer processor on a single integrated circuit) which implements algorithms to produce a digital signal, representative of sound and having a manageable size, which carries characteristic information about the sound, or comprises confirmation of detection or identification of a target sound, and which can be transmitted or streamed over the vehicle data bus (114). In one embodiment, the microcontroller may also analyze the analog input to determine power and signal strength, in which case amplitude information of the analog signal is derived and transferred to the vehicle data bus for communication to the vehicle control system.

Vehicle Data Bus.

A "vehicle data bus" refers to a specialized internal communications network that interconnects components inside a vehicle. Networking protocols must account for special requirements for vehicle control, such as assurance of message delivery, non-conflicting messages, minimum time of delivery, low cost, and EMF noise resilience, as well as redundant routing and other characteristics. Known protocols and buses include the Controller Area Network (CAN), Local Interconnect Network (LIN), and others.

CAN is a mid-level control bus for which there is a power supply as part of the nominal specification. High speed CAN buses offers baud rates from 40 Kbit/s to 1 Mbit/sec, while low speed/fault tolerant CAN offers baud rates from 40 Kbit/s to 125 Kbits/sec.

LIN is a lower performance, non-critical bus which is typically used to control accessories such as side mirrors. A low-speed network such as a LIN bus could be used as a communication path for a vehicle control system which communicates only a notification of detection of a particular target sound. For example, microphones (102) placed in the side view mirrors (as shown in FIG. 6) may be polled periodically, or push a notification, regarding target sound detection.

Figure 8:
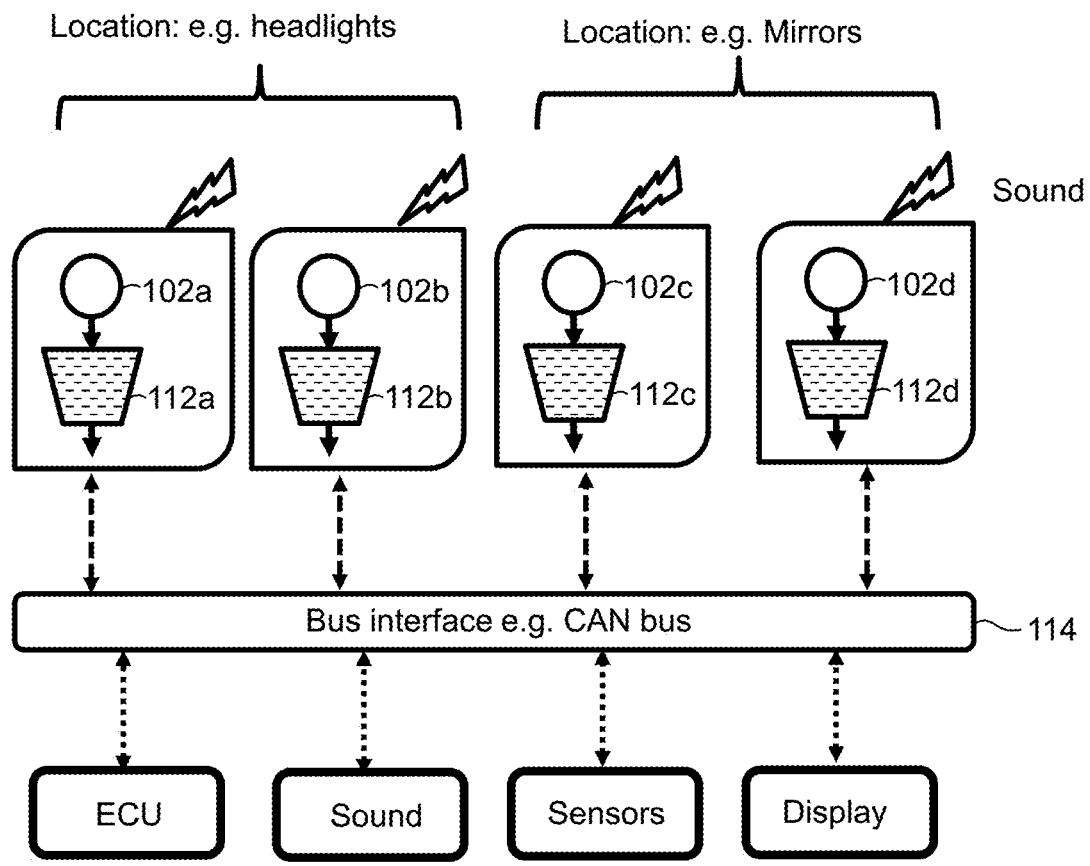
FIG. 8 shows a schematic depiction of an embodiment of a system of the present invention comprising multiple microphones operatively connected to a data bus at multiple nodes.

FIG. 8 shows a schematic representation of an embodiment of a system (100) having multiple microphones (102a to 102d), each with an associated analysis module which is physically integrated with the microphone (112a to 112d). Preferably, a microphone (102a to 102d) will be connected to the vehicle data bus (114) at a location that is physically proximate to where the microphone is placed. For example, microphones (102a, 102b) installed as part of a headlight assembly are connected to locations of the vehicle data bus (114) near the headlight assemblies, while microphones (102c, 102d) installed on vehicle side mirrors are connected to locations of the vehicle data bus near the side-view mirrors. The data buses may not necessarily be the same data bus. In particular, it may be advantageous to connect directly to an existing vehicle data bus (114), to avoid adding additional wiring.

Other known devices or systems may be connected to the bus (114) in conventional fashion, and may potentially be used to deliver notifications to a vehicle operator, in the case of a sound system (stereo system or a chime) or display system (dashboard or display screen). Other sensors and control systems (e.g. the ECU) may be connected to the bus, as is well known in the art.

Figure 9:
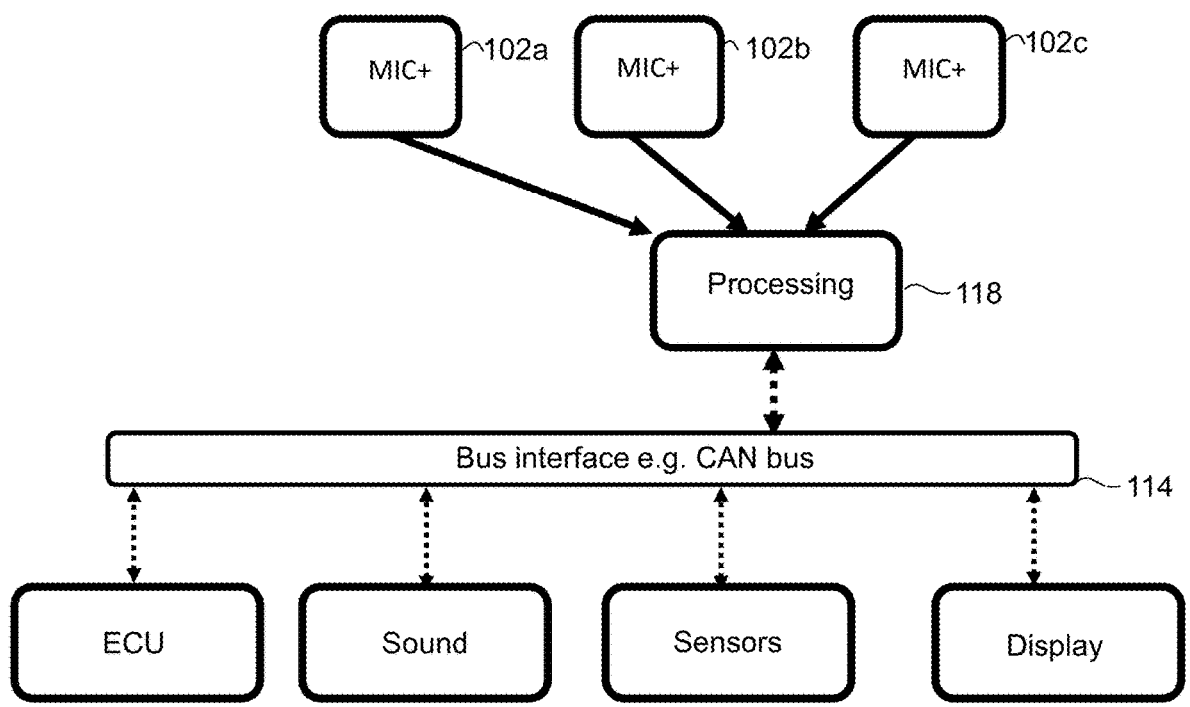
FIG. 9 shows a schematic depiction of another embodiment of a system of the present invention comprising multiple microphones operatively connected to a data bus at a single node.

FIG. 9 shows a schematic representation of an alternative embodiment of a system (100) having multiple microphones (102a to 102d). In one embodiment, the system may comprise circuitry that combines the digital signals of the plurality of microphones/analysis modules to produce a combined signal, and presents the combined signal to a single node of the vehicle data bus. In some cases, it may be advantageous to provide a separate bus for the microphones (102). In one embodiment, a plurality of microphones (102a to 102c) and associated circuitry are powered from a single module or box (118) which provides power to sensors, combines their output signals and presents this as a single node on the vehicle data bus (114).

Additional Processing Components.

In one embodiment, as shown in FIG. 2, the system (100) includes a first analog filter (104), a second analog filter (106), and an amplifier (108) which may be a logarithmic amplifier, to process the analog signal produced by the microphone (102). The analog signal is then received by the comparator (110) where the analog form is converted to a digital signal in a voltage level detector which effectively functions as an analog-to-digital (A/D) converter. The amplifier (108), the first analog filter (104), and the second analog filter (106) may be arranged to process a signal in a different order from that shown in FIG. 2. The analysis module (112) then checks if the processed signal contains any sounds of interest, and communicates their identification and presence to a vehicle operator or to a vehicle control system (116) via the vehicle data bus interface (114). Other important characteristics (such as timing and signal strength) may also be identified and communicated.

The system (100) may be tuned to detect and report specific sounds of interest to a driver or a vehicle control system. A non-limiting list of such sounds may include emergency vehicle sirens, other vehicle horns, crosswalk assistance sounds for visually impaired pedestrians or other sounds associated with pedestrians, skidding tires which may be indicative of a vehicle losing control, sounds associated with vehicles colliding with other vehicles or obstructions. Exemplary systems include the siren detection systems as described in co-pending U.S. patent application Ser. No. 15/909,709, filed Mar. 1, 2018, the entire contents of which are incorporated herein by reference, where permitted. In general, such systems include a computer processor configured to compare the digital signal produced by the analog-to-digital converter to a stored digital target sound template to determine a degree of similarity between the digital signal and the template, and to generate an output signal if the degree of similarity exceeds a threshold.

Sensory data received from the plurality of microphones may be synchronized with an onboard computing device to derive directional, geo-spacing or identification information regarding the vehicle surroundings as primary or redundant perception sensors. The synchronization between audio sensing devices may be through the onboard computing device, may be self-synchronized in the vehicle network, or may be synchronized by peer-to-peer synchronization. In one embodiment, a central module (118) periodically, for example every few seconds, sends out a synchronization pulse to all the microphones on the bus. Upon receipt of this synchronization pulse, the microphones reset their time counters to essentially synchronize themselves to the same time reference and avoid drifts between the clocks in each microphone. The microphones send timestamps to the central module indicating when they detected signals, and the differences in these timings are what the central module uses to calculate direction.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A system for providing audio-derived information to a vehicle operator or vehicle control system of a vehicle, the system comprising:
   (a) a plurality of external microphones mounted to the vehicle, each generating an analog signal in response to sound waves external to the vehicle;
   (b) a plurality of analysis modules, each associated with a microphone and each connected to a vehicle data bus, wherein each analysis module is configured to:
      i) convert the analog signal to a digital representation of sound, identify a sound of interest if present, and produce a digital signal which comprises a positive identification of the sound of interest, and not any digital auditory data;
      ii) communicate its digital signal to the vehicle operator or vehicle control system through the vehicle data bus.

2. The system of claim 1, wherein the system comprises circuitry that combines the digital signals of the plurality of analysis modules to produce a combined signal, and presents the combined signal to a single node of the vehicle data bus.

3. The system of claim 1, wherein at least one microphone is integrated with a housing of a light assembly of the vehicle.

4. The system of claim 1, wherein at least one microphone is integrated with a side mirror of the vehicle.

5. The system of claim 1 further comprising an amplifier operatively connected to each microphone for amplifying the analog signal.

6. The system of claim 1, further comprising an electronic filter operatively connected to each microphone for filtering frequencies of the analog signal.

7. The system of claim 1, wherein the vehicle data bus operates in accordance with a Controller Area Network (CAN) bus protocol or a Local Interconnect Network (LIN) bus protocol.

8. The system of claim 1, wherein each analysis module comprises a time counter, the system further comprising a central console configured to periodically send a synchronization pulse to all the analysis modules connected on the vehicle data bus, where the synchronization pulse causes each analysis module to reset the time counter to synchronize the microphones to the same time reference.

9. The system of claim 8 wherein each analysis module is configured to include a time stamp in the digital signal, and the central console is configured to determine a direction of a target sound based on the timestamps.

10. A method for providing audio-derived information to a vehicle operator or a vehicle control system of a vehicle, the method comprising the steps of:
    (a) using a plurality of externally facing microphones mounted on the vehicle, each microphone generating an analog signal in response to sound waves external to the vehicle,
    (b) converting each analog signal to a digital representation of sound with an analysis module bundled with each microphone, identify a sound of interest if present, and produce a digital signal which comprises positive identification of the sound of interest, and not any digital auditory data, wherein each analysis module is connected to a vehicle data bus; and (c) communicating each digital signal to the vehicle operator or vehicle control system through the vehicle data bus.

11. The method of claim 10, further comprising the step of combining the digital signals of the plurality of analysis modules to produce a combined signal, and presenting the combined signal to a single node of the vehicle data bus.

12. The method of claim 10, further comprising the step of amplifying the analog signal.

13. The method of claim 10, further comprising the step of electronically filtering frequencies of the analog signal.

14. The method of claim 10, wherein the vehicle data bus operates in accordance with a Controller Area Network (CAN) bus protocol or a Local Interconnect Network (LIN) bus protocol.

15. The method of claim 10, comprising the further step of periodically sending a synchronization pulse to all the analysis modules connected on the bus, where the synchronization pulse causes each analysis module to reset a time counter to synchronize the microphones to the same time reference.

16. The method of claim 15 further comprising the step of determining a direction of a target sound based on a time-stamp or a time reference included in each analysis module digital signal, upon receiving confirmations of detection of a target sound from at least two analysis modules.

17. A vehicular auditory sensing system to provide an input to a vehicle operator or a vehicle control system, comprising at least one externally facing microphone coupled to an analysis module configured to convert an analog signal produced by the microphone to a digital signal and configured to communicate the digital signal to a vehicle data bus operating at a baud rate of less than 1 Mbit/sec, for transferring the digital signal to the vehicle operator or the vehicle control system, wherein the digital signal comprises confirmation of identification of a target sound and not any digital auditory data.

18. The system of claim 17 further comprising an apparatus for physically filtering sound to the at least one microphone, the apparatus comprising:

(a) a front enclosure in front of the microphone, wherein the front enclosure is cylindrical, parabolic, conical or prismatic and defines an acoustic chamber in front of the transducer, and wherein the front enclosure defines at least one port opening allowing sound waves to travel into the acoustic chamber to the microphone; and (b) a sound-attenuating material disposed within the acoustic chamber to absorb sound entering the acoustic chamber before impinging on the transducer.

19. The apparatus of claim 18, wherein the acoustic-chamber is cylindrical in shape, and has a length in the forward direction and a width perpendicular to the forward direction, wherein the length is greater than the width.

20. The apparatus of claim 18, wherein the sound-attenuating material attenuates sound waves having a frequency less than about 500 Hz.

21. The apparatus of claim 20, wherein the sound-attenuating material comprises a porous or fibrous material.

22. The apparatus of claim 21, wherein the sound-attenuating material comprises mineral wool, fiberglass, cellulose, or cotton.

23. The apparatus of claim 22, wherein the mineral wool comprises basalt.

* * * * *